United States Patent [19]

Fay et al.

[11] Patent Number: 5,348,084
[45] Date of Patent: Sep. 20, 1994

[54] DEVICE FOR CARRYING OUT MEASURING AND SERVICING OPERATIONS IN A WELL BORE AND USE IN AN OIL WELL

[75] Inventors: Jean-Baptiste Fay, Paris; Michel Huvey, Bougival, both of France

[73] Assignee: Institut Francais du Petrole, Rueil Malmaison Cedex, France

[21] Appl. No.: 976,509

[22] Filed: Nov. 13, 1992

[30] Foreign Application Priority Data

Nov. 13, 1991 [FR] France ............... 9114065

[51] Int. Cl.$^5$ .................. E21B 17/00; E21B 19/00
[52] U.S. Cl. ................................... 166/65.1
[58] Field of Search .............. 166/384, 385, 65.1, 166/250; 428/373, 397; 340/854.9; 181/102

[56] References Cited

U.S. PATENT DOCUMENTS

| | | | |
|---|---|---|---|
| 3,700,544 | 10/1972 | Matsui | 428/397 |
| 3,889,579 | 6/1975 | Wiechowski et al. | 166/68 |
| 4,024,913 | 5/1977 | Grable | 166/72 |
| 4,563,391 | 1/1986 | Tanner et al. | 166/68 |
| 4,715,443 | 12/1987 | Gidley | 166/250 |
| 4,749,341 | 6/1988 | Bayh, III | 166/385 |
| 5,080,175 | 1/1992 | Williams | 166/385 |
| 5,184,682 | 2/1993 | Delacour et al. | 166/385 |
| 5,234,058 | 8/1993 | Sas-Jaworsky et al. | 166/385 |

FOREIGN PATENT DOCUMENTS

| | | |
|---|---|---|
| WO91/14072 | 9/1991 | PCT Int'l Appl. . |
| 397262 | 5/1932 | United Kingdom . |
| 809112 | 5/1955 | United Kingdom . |

Primary Examiner—Ian J. Lobo
Attorney, Agent, or Firm—Antonelli, Terry, Stout & Kraus

[57] ABSTRACT

A device for carrying out at least one of measuring or servicing operations in a well, with the device including a rod which is stiff against compression and elastic in flexure and a measuring instrument fastened to an end of the rod. The rod includes a core having a flattened cross sectional shape adapted to provide the rod with a high flexibility in flexure in a first plane, with respect to a flexure in a plane orthogonal to the first plane. At least one energy or information transfer line is incorporated or embedded during manufacturing the core which is made of a composite material. A sheath embedded in the core so as to provide the rod a substantially cylindrical outer shape. The device is applicable to be used in a well producing an oil effluent.

13 Claims, 3 Drawing Sheets

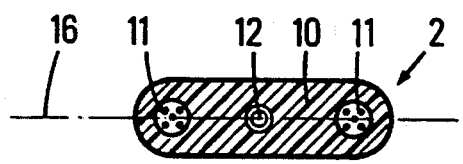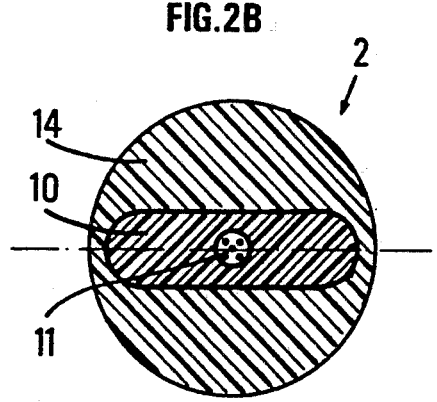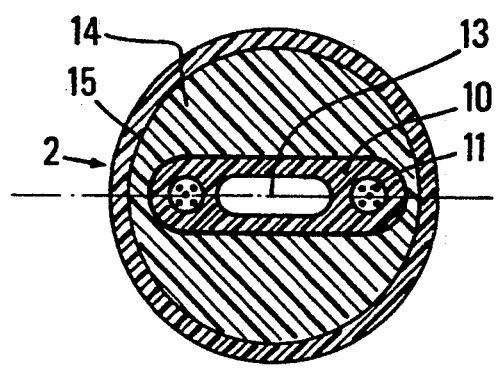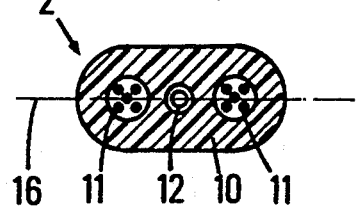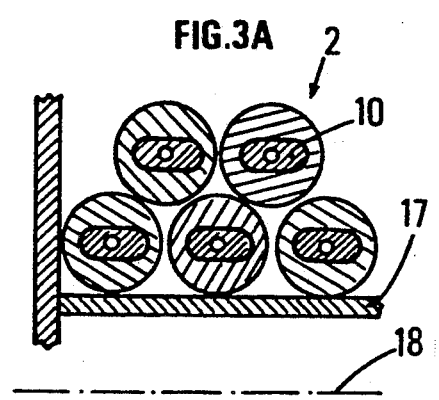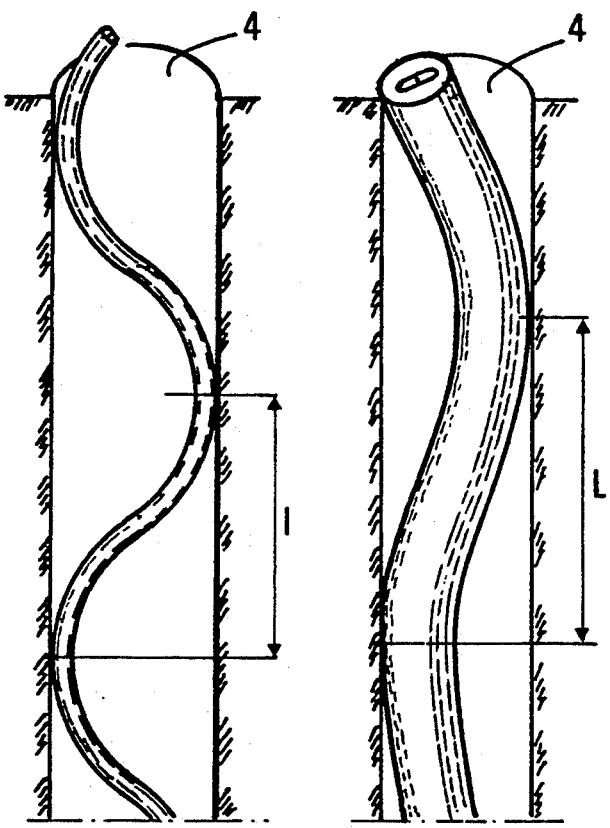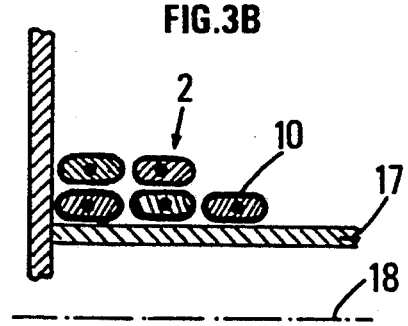

DEVICE FOR CARRYING OUT MEASURING AND SERVICING OPERATIONS IN A WELL BORE AND USE IN AN OIL WELL

BACKGROUND OF THE INVENTION

The present invention relates to a device and to an application of this device allowing measurements and/or servicing to be carried out in a well at the level of the surrounding formations.

The invention is notably applicable when the measurements and/or servicing are to be carried out at the level of geologic formations crossed through by a well. In this case, the measurements performed may comprise recording the bottomhole pressure and temperature, measuring the electrical resistivity, as well as acoustic, nuclear measurements, etc. Perforating guns, completion tools or visual display cameras may also be used.

These measuring and/or servicing techniques are known by specialists and will not be described more in detail hereafter.

The present invention is particularly well suited for carrying out measurements and/or servicing in an oil production well comprising a drain strongly inclined with respect to the vertical or even horizontal.

U.S. Pat. No. 4,685,516 describes a well-known system for carrying out measurements or servicing in a well, comprising a metallic tubing coiled by plastic strain around a drum, with an electric transmission cable being slipped into the tubing. Setting such a cable is problematic because it can only be achieved when the tubing is completely uncoiled. Moreover, the plastic strains induced by coiling around the drum decrease the reliability of the system because of the fatigue resulting therefrom. It is the same for corrosion processes.

In French 2,631,708 describes a device for carrying out measurements and servicing in a well, which improves the technique by solving most of the drawbacks of the device cited above. But the rod disclosed in this document presents the disadvantage of having such a rigidity that the diameter of the drum is too bulky.

SUMMARY OF THE INVENTION

The drawbacks of devices according to the prior art are considerably reduced, if not avoided, through the use of the device according to the present invention for carrying out measurements and/or servicing in a well, this device comprising a rod and a measuring and/or servicing instrument arranged at a lower end of the rod, with the rod being elastic in flexure and stiff against compression.

The rod of the device is adapted for being coiled round a drum and comprises a core made of a polymeric material comprising reinforcing fibers. Over at least one length of the rod, the shape of the core profile along a cross-section of the rod is adapted so that the stresses induced by the flexure of the rod in a first plane passing through the center of gravity of the profile are notably lower by comparison with those induced by a flexure in a plane substantially orthogonal to the first one.

The rod may comprise at least one line adapted to transfer energy or information, such as an electrical, fluidic or optical line, with the line being embedded in the material of the core.

The rod may comprise at least one sheath made of a polymeric material having a breaking elongation higher than that of the core.

The outer profile of the sheath may be substantially circular.

The material of the core may comprise glass, carbon or polyaramide fibers embedded in a matrix made of thermoplastic or thermosetting resin.

This material may preferably comprise glass fibers embedded in an epoxide, unsaturated polyester, phenolic or vinylester resin.

The material of the sheath may be selected from the elements of the following polymer group: polyamide, polyvinylidene fluoride, polyolefin cross-linked or not, polyvinyl chloride, polysulfone, polyphenylene oxide or polyphenylsulfide.

The outer profile of the core may be substantially twice as wide as it is thick and the flanks may be rounded in the shape of a circle with substantially the thickness of said core as the diameter.

The nature of the material constituting the outside of the rod may be suited for decreasing friction between the rod and the walls of the well and/or it may comprise an anti-abrasion agent.

Advantageously, the rod may be manufactured continuously by extrusion or pultrusion.

Additionally core may be tubular.

The invention also provides an application of the device to a well producing an oil effluent and comprising a portion strongly deflected with respect to the vertical.

BRIEF DESCRIPTION OF THE DRAWINGS

Other features and advantages of the invention will be clear from reading the description hereafter given by way of non limitative examples, with reference to the accompanying drawings wherein:

FIGS. 2A, 2B, 2C and 2D show a section of the rod according to four embodiments, FIGS. 3A and 3B show a partial section of a drum along a plane passing through the axis of rotation, FIG. 4A shows the buckling deformation of the rod in the well, FIG. 4B shows another mode of buckling of the rod.

DESCRIPTION OF THE PREFERRED EMBODIMENTS

Figure 1:
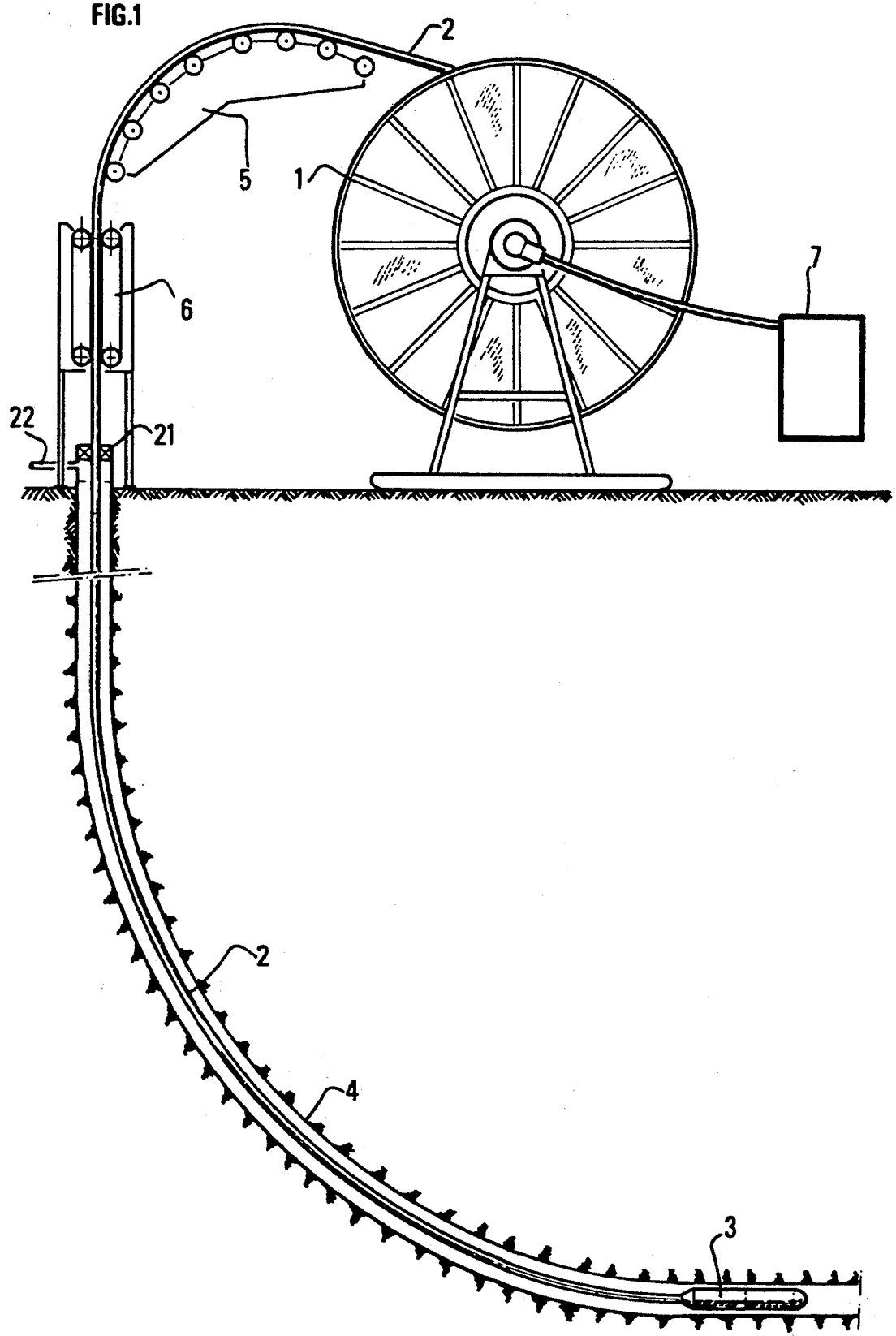
FIG. 1 shows a device according to the invention being set in the well.

In FIG. 1, numeral 1 indicates the drum around which is wound a rod 2 which is of use in the displacement of an instrument 3 in well 4, so as to carry out the measurements and/or servicing in one or several zones of well 4.

Rod 2, which is flexible, leaves drum 1 by passing over a return part 5, such as an array of pulleys, adapted for positioning the rod 2 in line with the well 4, whatever the position of the drum 1 and the filling thereof, and runs through traction and thrust means adapted for pushing the rod 2 into the well 4, for holding it back or for withdrawing it therefrom.

These traction and thrust means 6 may, for example, consist of two rubber tracks holding the rod 2 tight and moving in the requisite direction for maneuvering the rod 2.

Rod 2, which withstands compressive stress so as to allow thrust on instrument 3, is made up of a very limited number of sections and may even comprise only a single section.

Rod 2 comprises at least one line adapted for energy and/or information transfer, such as one or several electrical, fluidic or optical lines, which allows instrument 3 arranged at the lower end of rod 2 to be connected to the surface where the upper end of rod 2 is located. Apparatuses 7 for monitoring and/or controlling instrument 3 are connected to this upper end, possibly by a rotating connector.

The surface installation shown in FIG. 1 can be completed with a sealing system 21 arranged around the rod and fastened to the head of well 4. A pipe 22 communicates with well 4 below seal assembly 21 and allows injection or collection of fluid into or coming from the well/rod annulus.

In FIGS. 2A and 2D, the rod simply consists of a core 10 comprising at least one electrical line 11. With the rod comprising two electrical lines, for example, one measuring line and one power line, and a pipe 12 for fluidic transmission.

The profile of the core of the rod is flattened, which gives it a propensity to bend more easily around an axis parallel to the largest dimension thereof, which in the illustrated embodiment is the axis 16.

This flattened shape is notably designed by taking into account the surface of this section so that the rod can withstand determined tractive and compressive stresses, with the safety coefficients that are usual in the profession. The thickness of the core, or the main dimension along an axis perpendicular to axis 16, is calculated as a function of the flexure stresses allowable in the material of the core, when the rod is bent along a curvature of axis parallel to axis 16.

The flattened shape of the core allows a bending radius smaller than for a cylindrical core, for the same section area and for identical stresses.

This core shape gives the rod the capacity to be coiled around a drum of less bulky diameter, by comparison with a cylindrical rod.

The preferred core shape is shown in FIG. 2D where the overall width of the core is double the thickness and the flanks along the axis 16 have a semicircular shape with the thickness as the radius.

This shape, which may be 17 mm thick and 34 mm wide, has a section equivalent in surface to a 25.6 mm diameter circular section. As for longitudinal stress resistance, the two rods having the two previous core sections will be equivalent.

On the other hand, elongations, and therefore tractive stresses, of the fibers which are the most distant from the curvature of the drum are lower for the flattened core than for the cylindrical core.

All other things being equal, the previous cylindrical rod, which could coil by elastic deformation around a drum three meters in diameter, will coil around a two-meter diameter drum in the same conditions if the core has the flattened shape described above.

The general shape of the core may be different from that described above without departing from the scope of this invention, but only if the rod exhibits a privileged plane of curvature, that is if the core of the rod is more supple in one plane and more rigid in a substantially orthogonal direction.

Figure 5:
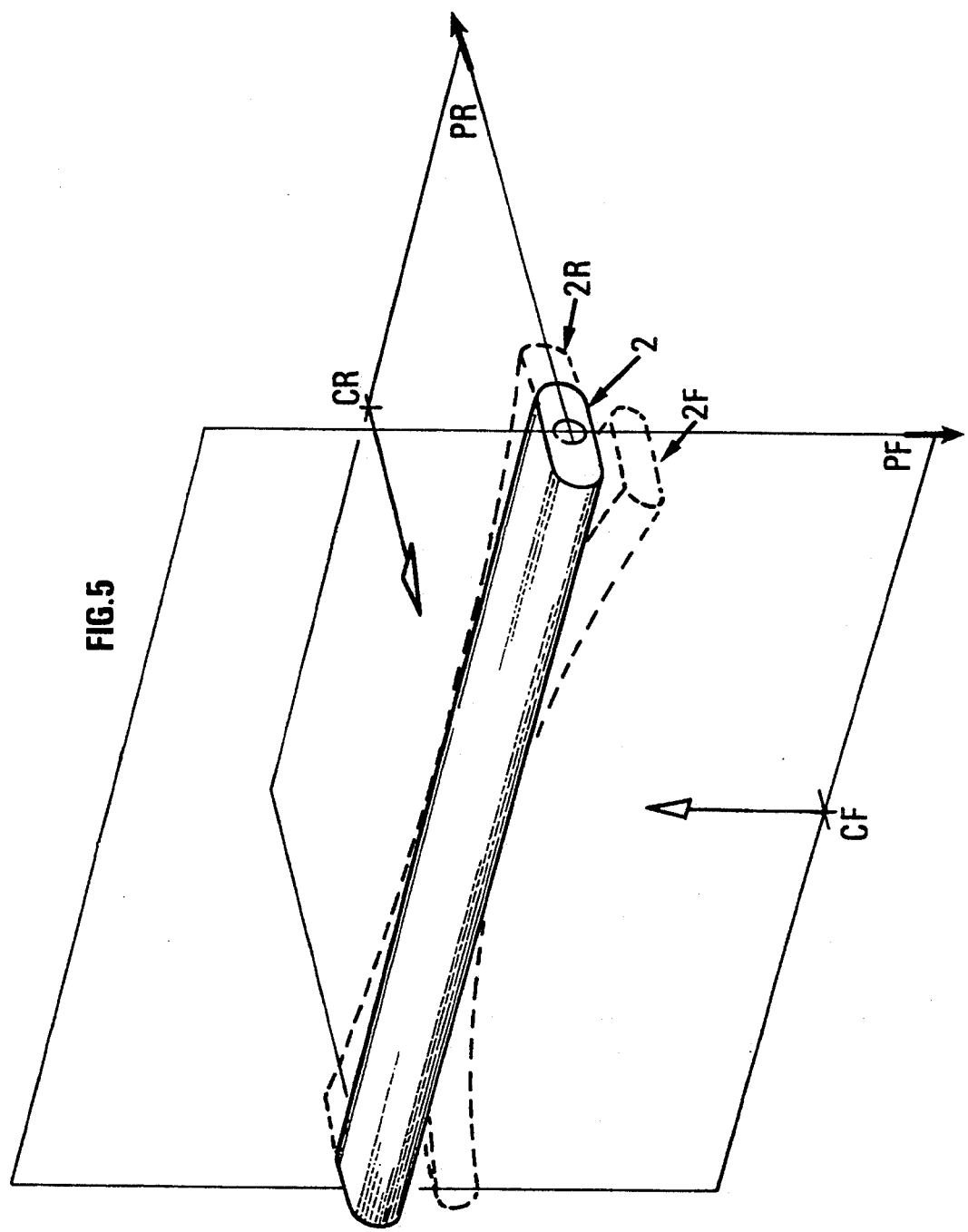
FIG. 5 shows the flexure of the rod along two orthogonal planes.

FIG. 5 shows the two orthogonal planes PR and PF. These two planes PR,PF secant substantially on the neutral axis of rod 2. Rod 2F is bent so as to maintain its neutral axis substantially in plane PF and to have CF, included in this plane, as the center of curvature. Rod 2R is bent so as to keep its neutral axis substantially in plane PR and to have CR, included in plane PR, as the center of curvature. In FIG. 5, the two elastic lines 2F and 2R can be compared for the same bending radius, the flexural stresses induced in the rod 2F are lower than those in the rod 2R, and, for the same flexural stresses, the bending radius of the rod 2F will be less than that of the rod 2R.

The use of this distinctive feature of the core profile is illustrated in FIG. 3B where drum 17 of the winch for storing the rod 2 has the axis referenced 18 as the axis of rotation. The core 10 of rod 2 is coiled so that the widest dimension thereof is parallel to the axis of the drum 17.

The core of the rod 2 may be made of a polymeric material comprising glass, carbon or polyaramide reinforcing fibers embedded in a thermoplastic or a thermosetting resin matrix. The matrix is advantageously an epoxide, phenolic, unsaturated polyester or vinylester resin.

The reinforcing fibers are notably parallel to the longitudinal axis of the rod 2 so as to withstand preferably longitudinal stresses.

Energy and/or control transfer line or lines 11, 12 are advantageously embedded in the rod 2 during the manufacturing thereof. Pultrusion or extrusion techniques may be used therefore, through which a malleable material is respectively pushed by a press into a die or drawn at the outlet of a die. The profile of the die gives the profile of the rod 2. Core 10 may be hollow as referenced by the numeral 13 in FIG. 2C.

FIG. 4A illustrates the compressive buckling of a rod consisting of a core as in FIGS. 2A and 2D. The rod presses up against the walls of well 4 along a wave whose half-wavelength is shown by reference P. The suppler the rod, the shorter this distance P, and the more contact points there are. The thrust force on such a rod depends notably on the buckling strength of the rod, on the number of contacts and on the contact force against the wall of well 4.

Of course, it is no longer possible to drive the rod forward into the well when the well is too wide or when the rod is too thin and too supple.

It is also well-known that a rod having an axially symmetric inertia, on buckling in a cylinder, sometimes presses up in a spiral. There is then no more point contact but an extended contact. Friction becomes very considerable in this case. The shape of the core of the rod according to the invention limits this phenomenon since, the buckling deformation occurring at minimum energy, the rod tends to remain within a plane perpendicular to the largest width of the core.

These deformation difficulties often limit the use of such a rod to the introduction thereof in a well whose inside diameter is not too large with respect to the rod diameter. This limits deformation of the rod when it is in compression. In fact, the smaller the ratio of the well diameter to the rod diameter is, the less the amplitude of the deformation wave will be high.

Core 10 can also be embedded in a supple plastic material as shown in FIG. 2B. Core 10 is embedded in a sheath 14 whose outer shape is substantially cylindrical. One main function of sheath 14 is notably to limit the deformation of rod 2 as shown in FIG. 4B, the core of rod 2, the diameter of well 4 and the compressive force being identical in both FIGS. 4A and 4B. Distance L is then greater than P.

The material of sheath 14 is generally devoid of reinforcing elements and selected from the elements of the following polymer group : polyamide, polyvinylidene fluoride, polyolefin cross-linked or not, polyvinyl chloride, polysulfone, polyphenylene oxide or polyphenylsulfide.

The breaking elongation of the material of sheath 14 will be preferably less than the breaking elongation of the composite material of the core.

The main functions provided by the sheath 14 are notably increasing the outer dimension of the rod without limiting the elasticity in flexure of the core; providing the rod with a substantially revolution outer shape; protecting the composite material and the reinforcing fibers of the core against ambient aggressiveness; limiting the coefficient of friction against the walls of the well by comprising adapted products; and preventing abrasion due to friction of the core on the walls of the well.

As stated above, it is the core which withstands the main tractive and compressive stresses, and the function of the sheath is advantageous for protecting the core against wear or destruction processes due to agressive fluids.

In order to improve or to complete this protection in the most severe situations, the sheath may also be coated with another thickness 15 as shown in FIG. 2C.

The techniques for manufacturing rods having a profile as in 2B and 2C will be similar to those described above, but each material will impose the use of a specialized equipment.

Manufacturing can be achieved continuously, i.e. the end product is obtained in a single pass. But it may also be performed with as many passes as material, which then imposes drum storage between each passage through the appropriate die.

FIG. 3A shows the storage of rod 2 when the core thereof is embedded in at least one sheath 14. Coiling of the rod is achieved as a function of the orientation of the flat part of the core parallel to axis 18. In fact, the modulus of elasticity of the sheath material being lower than that of the core, the rod coils round an axis according to the orientation of the core which gives it the greatest flexibility.

The outer shape of the sheath of the core may be not substantially cylindrical without departing from the scope of this invention, but only if the functions and the advantages of the sheath or sheaths embedding the core are maintained.

Weighting fillers whose function consists in increasing the density of the rod may also be included in the material constituting the core or the sheaths. In fact, in case it is used in wells filled with a fluid of high density, the rod immersed in the well might tend to float, which requires additional thrust from the surface equipment. It is then preferable to have a heavier rod which will be compressed over a shorter length.

The rod according to the invention is advantageously used in a single section, but it will be possible to have several sections connected to one another by appropriate connectors and designed on the basis of above-noted FR-2,631,708.

It will be possible to insert ballasting elements between these various sections, for example equivalent to drill collars used in drilling.

We claim:

1. A device for carrying out at least one of measurement or servicing in a well bore inclined with respect to one of a vertical and a horizontal direction, the device comprising a rod and an instrument for at least one of measuring or servicing arranged at a lower end of said rod, said rod, being elastic in flexure and stiff against compression and being adapted to be coiled and uncoiled around a drum for enabling a displacement of the instrument in the well bore, the rod comprises a solid core made of a polymeric material comprising reinforcing fibers, wherein, over, at least one length of said rod, the shape of a profile of the solid core along a cross-section of the rod is adapted so that the stresses induced by the flexure of the rod in a first plane passing through a center of gravity of said profile are lower as compared with stresses induced by a flexure in a plane substantially orthogonal to the first plane, and wherein at least one transfer line for transferring at least one of energy or information is, during manufacturing, embedded in the respective material of said core, and wherein, upon a coiling on the drum, a widest dimension of the solid core of said rod is parallel to an axis of the drum and a buckling deformation of the rod while being inserted into the well bore is controlled.

2. A device as claimed in claim 1, wherein said at least one transfer line includes at least one of an electrical, fluidic or optical line.

3. A device as claimed in claim 1, wherein said rod comprises at least one sheath of polymeric material having a breaking elongation greater than a breaking elongation of said core.

4. A device as claimed in claim 3, wherein an outer profile of said sheath is substantially circular.

5. A device as claimed in claim 1, wherein said solid material of said core comprises glass, carbon or polyaramid fibers embedded in a matrix made of thermoplastic or thermosetting resin.

6. A device as claimed in claim 5, wherein said material comprises glass fibers embedded in an epoxide, unsaturated polyester, phenolic or vinylester resin.

7. A device as claimed in claim 3, wherein the material of said at least one sheath is selected from the elements of the following polymer group : polyamide, polyvinylidene fluoride, polyolefin cross-linked or not, polyvinyl chloride, polysulfone, polyphenylene oxide or polyphenylsulfide.

8. A device as claimed in claim 1, wherein an outer profile of the core is substantially twice as wide as it is thick, and wherein flanks of the outer profile are rounded in a circular shape having substantially a thickness corresponding to a thickness of said core as a diameter of the circular shape.

9. A device as claimed in one of claims 1 or 3, wherein a material constituting an exterior of said rod is adapted for decreasing friction between the rod and walls of the well bore.

10. A device as claimed in claim 1, wherein said rod is manufactured continuously by extrusion or pultrusion.

11. A device as claimed in claim 1, wherein the solid core is tubular.

12. A device adapted to be disposed in a well producing an oil effluent, with the well including a portion strongly inclined with respect to at least one of a vertical direction and a horizontal direction, the device comprising a rod and an instrument for producing at least one of measuring or servicing the oil effluent producing well arranged at a lower end of said rod, said rod, being elastic in flexure and stiff against compression, and being adapted to be coiled and uncoiled around a drum for enabling a displacement of the instrument in the oil effluent producing well, the rod comprises a solid core made of a polymeric material comprising reinforcing fibers, wherein, over at least a length of said rod, the shape of a profile of said solid core along a cross-section of the rod is adapted so that stresses induced by the flexure of the rod in a first plane passing through a center of gravity of said profile are lower as compared with stresses induced by a flexure in a plane substantially orthogonal to the first plane, wherein at least one transfer line for transferring at least one of energy or information is, during manufacturing, embedded in the material of said solid core, and wherein upon a coiling on the drum, a widest dimension of the rod is parallel to an axis of the drum and a buckling deformation of the rod, while being inserted into the oil effluent producing well, is controlled.

13. A device according to claim 9, wherein the material constituting an exterior of the rod includes an anti-abrasion agent.

* * * * *